United States Patent Office 3,024,168
Patented Mar. 6, 1962

3,024,168
PREPARATION OF POLYFLUOROALKOXY-
METHYL PENICILLINS
Joseph Lein and Lee C. Cheney, Fayetteville, N.Y., assignors, by mesne assignments, to Beecham Research Laboratories, Limited, Brentford, England, a corporation of Great Britain and Northern Ireland
No Drawing. Filed Apr. 10, 1959, Ser. No. 805,390
3 Claims. (Cl. 195—36)

This invention relates to new antibiotic compounds and their salts and, more particularly, to novel polyfluoroalkoxymethyl penicillins, their nontoxic salts and methods of their preparation.

In the past, the most useful penicillin (penicillin G) has been assigned the formula:

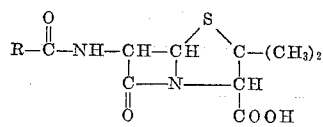

where R is benzyl, and the name is benzylpenicillin. Benzylpenicillin, although very useful, has suffered from the disadvantage of being unstable in water, particularly in aqueous acid. It has also been found to be inefficient, particularly on oral administration, in the sense that much of the dosage given in therapy does not appear in the blood stream in active form; i.e. some has decomposed and is no longer antibacterially effective. The metal and substituted ammonium salts of benzylpenicillin have the same disadvantages, especially as their solubility in water increases. Such solubility in water is often to be desired, however, to facilitate absorption from the intestinal tract, or release from a site of injection, into the blood stream.

An object of the present invention is to overcome the disadvantages of benzylpenicillin and to produce new penicillins which are stable in the presence of water and particularly of aqueous acid as well as being nontoxic and therapeutically effective. A further object of the present invention is to provide various useful salts of such new penicillins and processes for their preparation. It is also an object of this invention to provide new chemical compounds which are useful intermediates in the production of novel penicillins.

The novel compounds of the present invention include (2,2,2-trifluoroethoxy)methyl penicillin which, in its acid form, has the formula:

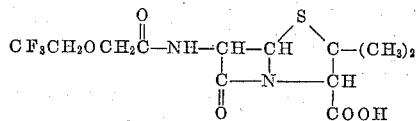

and a group of penicillins having, in their acid form, the formula:

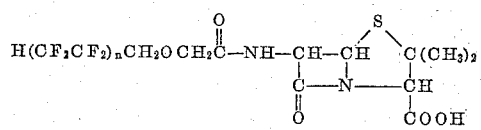

wherein $n$ is an integer within the range of from 1 through 5. A preferred compound of the present invention is (2,2,2-trifluoroethoxy)methyl penicillin. Included in the present invention are the nontoxic salts of these penicillins, that is, nontoxic metallic salts such as sodium, potassium, calcium and aluminum, the ammonium salts and substituted ammonium salts, e.g., salts of nontoxic amines illustratively procaine, dibenzylamine, N-benzyl-β-phenethylamine, 1-ephenamine, N,N'-dibenzylethylenediamine, dehydroabietylamine, and N,N'-bis-dehydroabietylethylenediamine. The salts are prepared in accordance with methods known in the art in conjunction with benzylpenicillin salts and are illustrated by Examples VI and VII. These novel penicillins in their acid form, as well as in their salt form, are stable in the presence of water and of aqueous acid and are therapeutically effective.

There is further provided, according to the present invention, the method of producing a new penicillin which comprises growing a Penicillium mold of the group *notatum-chrysogenum* in a culture medium, preferably a submerged culture, in the presence of an effective proportion, suitably less than about five percent, of a precursor selected from the group consisting of the compounds having the formula:

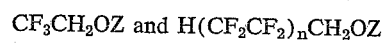

wherein $n$ represents an integer ranging from 1 through 5 and Z represents a radical selected from the group consisting of —$CH_2COOH$, —$CH_2COOM$ where M represents a metal or ion which does not inhibit the fermentation, —$CH_2CH_2NH_2$, —$CH_2CONHCH_2CH_2OH$, —$CH_2CONH_2$, —$CH_2CHO$, —$CH_2CH_2OH$, and radicals which are transformed into the equivalent of the $CH_2COOH$ radical during the course of the fermentation, and isolating the new penicillin so produced. Equivalents of these substituted acetic acids thus include simple derivatives such as salts, esters, amides and anhydrides, as well as omega-substituted, saturated straight chain alcohols, amines, aldehydes and acids containing an even number of carbon atoms, and the simple derivatives thereof, all of which the mold may convert to the monosubstituted acetic acids.

The precursors used in the present invention are new compounds. One of the preferred precursors of this invention, 2-(2,2,2-trifluoroethoxy)acetic acid, which is used in the production of (2,2,2-trifluoroethoxy)methyl penicillin, can be prepared from trifluoroethanol by the procedure set forth below in detail in Example I. Precursors of the formula $H(CF_2CF_2)_nCH_2OZ$ can be prepared from the corresponding trihydrofluoro alcohols, e.g., 2-(2,2,3,3-tetrafluoropropoxy)acetic acid can be prepared from 2,2,3,3-tetrafluoropropanol by the procedure set forth below in Example II. As pointed out above, the equivalents of these substituted acetic acids, such as their salts, esters, amides and anhydrides, can be conveniently prepared from the corresponding substituted acetic acid. These precursors are readily prepared, as shown in the examples, by heating commercially obtainable fluoro alcohols with the appropriate organic halides in the presence of at least an equivalent amount of aqueous alkali. Alternatively, these ethers, i.e., the precursors, can be prepared from the fluoro alcohols and an organic halide in an anhydrous medium such as toluene using alkali hydrides as the condensing agent. The precursors which are useful in the preparation of the novel polyfluoroalkoxymethyl penicillins of the present invention are illustrated by such compounds as the two monosubstituted acetic acids mentioned above in this paragraph and by such additional examples as the sodium and potassium salts of 2-(2,2,3,3,4,4,5,5,-octafluoropentoxy)acetic acid; 2-(2,2,2-trifluoroethoxy)acetamide; 2-(2,2,3,3,-tetrafluoropropoxy)acetic anhydride; 2-(2,2,3,3,4,4,5,5-octafluoropentanoxy)ethylamine; 2-(2,2,3,3,4,4,5,5,6,6,7,7-dodecafluoroheptoxy)ethanol; 2-(2,2,2-trifluoroethoxy)acetaldehyde; the ethyl ester of 2-(2,2,3,3-tetrafluoropropoxy)acetic acid; N-[2-(2,2,2-trifluoroethoxy)acetyl]-glutamic acid; and 2,(2,2,3,3-tetrafluoropropoxy)acethydrazide.

Culture of the medium containing the new precursor and the isolation of the new penicillin are conducted according to the methods known in the art; e.g. U.S. Patents 2,562,410 and 2,440,359. The proportion of precursor to be used varies widely. The maximum concentration conveniently is about five percent and the minimum is that necessary to produce a reasonable amount of the new penicillin. The precursor is ordinarily used in a concentration of about 0.01 to 1.0 percent and preferably about 0.05 percent to 0.5 percent.

The invention is more fully illustrated without limitation thereof by the following specific examples.

EXAMPLE I

*Preparation of 2-(2,2,2-Trifluoroethoxy)Acetic Acid*

A solution of 20.0 g. (0.5 mole) sodium hydroxide in 100 ml. of water is prepared and 50.0 g. (0.5 mole) trifluoroethanol is added drop-wise with stirring to the solution. An aqueous solution of sodium chloroacetate, 58.3 g. (0.5 mole) in 125 ml. of water, is then added drop-wise to the first solution and the reaction mixture is refluxed to complete the reaction, e.g., overnight. The reaction mixture is then cooled, immersed in ice and acidified to pH 2 with concentrated hydrochloric acid, whereupon white solids are found in the yellow solution. The solid material is then filtered off and the filtrate extracted five times with ether. The ether extracts are then combined and dried over anhydrous sodium sulfate. After drying, the extracts are filtered and the solvent stripped from the extracted material. The residue, a yellow oil, is distilled at reduced pressure to yield 41.5 g. of 2-(2,2,2-trifluoroethoxy)acetic acid which is a clear oil having the following properties: B.P. 109–114° C. at 24 mm. Hg; refractive index, $n_D^{26} = 1.3632$.

*Analysis.*—Calculated for $C_4H_5O_3F_3$: C, 30.29%; H, 3.16%. Found: C, 30.29%, 30.68%; H, 3.77%, 3.86%.

EXAMPLE II

*Preparation of 2-(2,2,3,3-Tetrafluoropropoxy)Acetic Acid*

A solution of 8.0 g. (0.2 mole) sodium hydroxide in 50 ml. of water is prepared and 26.6 g. (0.2 mole) of 1H, 1H, 3H-tetrafluoro-1-propanol is added drop-wise with stirring to the solution. An aqueous solution of sodium chloroacetate, 23.3 g. (0.2 mole) in 62.5 ml. of water, is then added dropwise to the first solution and the reaction mixture is refluxed overnight. The reaction mixture is then cooled, and acidified to pH 2 with concentrated hydrochloric acid, whereupon white solids are formed in the solution. The solid material is then filtered off and discarded and the solution is extracted three times with ether. The ether extractions are then combined and dried over anhydrous sodium sulfate. After drying, the extractions are filtered and the solvent is stripped from the extracted material. The residue, a light brown oil, is distilled at reduced pressure to yield 15.2 g. of 2-(2,2,3,3-tetrafluoropropoxy)acetic acid which is a clear oil having the following properties: B.P. 104°–106° C. at 1 mm. Hg; refractive index, $n_D^{26} = 1.3699$.

*Analysis.*—Calculated for $C_5H_6O_3F_4$: C, 31.48%; H, 3.14%. Found: C, 31.59%; H, 3.38%.

EXAMPLE III

Fermentation Media I through VI are prepared, each of said media consisting of, on a weight basis, 5% lactose, 2% purified cottonseed meal, 0.4% calcium carbonate, 0.2% sodium sulfate, 1% lard oil in water, and a precursor as hereinafter indicated in the case of Media II through VI. Medium I contains no precursor, while Medium II contains, in addition to the ingredients which are common to Media I through VI, 0.5% of a 60% aqueous solution of the potassium salt of phenylacetic acid. Media III and IV contain 0.2% and 0.4%, respectively, of 2-(2,2,2-trifluoroethoxy)acetic acid, while Media V and VI contain 0.2% and 0.4%, respectively of 2-(2,2,3,3,-tetrafluoropropoxy)acetic acid. Each of the foregoing media are autoclaved (20 minutes at 15 pounds per square inch pressure), inoculated with *Penicillium chrysogenum* and aerobically fermented for 7 days at 74° F. Samples for analysis are removed from each media and centrifuged on the seventh day. The supernatant liquid from each sample is then filtered and the filtrate is assayed. A sample of each filtrate is also adjusted to pH 2 by the addition of hydrochloric acid, allowed to stand for 24 hours and then neutralized before analysis to remove acid-unstable penicillins as benzylpenicillin. The results of the assays on both the untreated broth and the acid-treated broth as taken from the fermentation medium on the seventh day are set forth below in Table A.

TABLE A

| Media | Precursor | Initial concentration of precursor in media, percent | Bioassay in Oxford units of penicillin per ml. | |
|---|---|---|---|---|
| | | | 7th day | 7th day acid treated |
| I | None (control) | 0.0 | 2,000 | 3 |
| II | 60% aqueous solution of potassium salt of phenylacetic acid. | 0.5 | 5,050 | 4 |
| III | 2-(2,2,2-trifluoroethoxy) - acetic acid. | 0.2 | 1,450 | 270 |
| IV | ____do____ | 0.4 | 1,550 | 450 |
| V | 2 - (2,2,3,3 - tetrafluoropropoxy) acetic acid. | 0.2 | 2,450 | 655 |
| VI | ____do____ | 0.4 | 2,400 | 640 |

It can be seen from the foregoing data of Table A that the penicillin produced from Media I and II, i.e., in the absence of the precursors of the present invention, assays at 2000 and 5050 Oxford units per ml., respectively, before acid treatment but that after acid treatment to remove acid-unstable penicillins the assay shows insignificant activity, i.e., only 3 and 4 Oxford units per ml., respectively. In the production of penicillins, as shown above, wherein 2-(2,2,2-trifluoroethoxy)-acetic acid and 2-(2,2,3,3-tetrafluoropropoxy)acetic acid are incorporated in the media in the above-stated quantities, there is produced a significant amount of the acid-stable penicillins (2,2,3,3-tetrafluoropropoxy)methyl penicillin and (2,2,2-trifluoroethoxy)methyl penicillin.

EXAMPLE IV

The filtered broth obtained from fermentation Media III and IV of Example I is treated with acid to remove acid-unstable penicillins, dialyzed through a cellophane membrane against distilled water to remove the inorganic salts and freeze-dried under vacuum to produce (2,2,2-trifluoroethoxy)methyl penicillin.

EXAMPLE V

*Preparation of (2,2,3,3-Tetrafluoropropoxy)Methyl Penicillin*

Aerobic culturing of *Penicillium chrysogenum* in a synthetic medium containing, in grams per liter of medium, glucose 75, tartaric acid 4, diammonium tartrate 4, $NH_4NO_3$ 4, $(NH_4)_2MPO_4$ 0.6, $K_2CO_3$ 0.6, $MgCO_3$ 0.4, $(NH_4)_2SO_4$ 0.25, $ZnSO_4.7H_2O$ 0.07, $FeSO_4.7H_2O$ 0.07 and 0.5 of 2-(2,2,3,3-tetrafluoropropoxy)acetic acid for seven days at 74° F. followed by the addition of ½ volume of methyl isobutyl ketone, agitation, filtration to remove the mycelial mat, acid treatment as set forth in Example III, dialysis of the filtrate through a cellophane membrane against distilled water to remove the inorganic salts, and finally freeze-drying of the dialysate under vacuum produces (2,2,3,3 - tetrafluoropropoxy)methyl penicillin.

EXAMPLE VI

The sodium salt of (2,2,2-trifluoroethoxy)methyl penicillin is prepared from the filtered broths of Medium IV of Example III by the addition thereto of N/10 sodium hydroxide solution to a pH of 7.0, followed by freezing and evaporation of the neutralized solution in vacuo from the frozen state.

EXAMPLE VII

The product of Example V, before freeze-drying is neutralized with N/10 sodium hydroxide solution to a pH of 7.0, frozen and evaporated in vacuo from the frozen state to produce the sodium salt of (2,2,3,3-tetrafluoropropoxy)methyl penicillin.

The novel penicillins of the present invention are readily combined with bases to form salts. Thus treatment of the penicillin in aqueous solution with a base, for example, sodium or potassium hydroxide, forms the sodium or potassium salt. The resulting product formed with base is then isolated by lyophilization, or, if the product is insoluble, by filtration. The penicillins of the present invention are similarly isolated from aqueous acidified broth by the usual procedures of multiple extractions and concentrations or by lyophilization; preferably the starting broth or an intermediate solution is first subject to acid conditions, e.g., as described above in Example III, to remove any benzylpenicillin or other acid-unstable penicillin which is present as an impurity.

EXAMPLE VIII

In a procedure analogous to that of Example V above, the novel penicillins (2,2,3,3,4,4,5,5-octafluoro-1-pentoxy)methyl penicillin, (2,2,3,3,4,4,5,5,6,6,7,7-dodecafluoro-1-heptoxy)methyl penicillin, (2,2,3,3,4,4,5,5,6,6,7,7,8,8,9,9-hexadecafluoro-1-nonoxy)methyl penicillin, and (2,2,3,3,4,4,5,5,6,6,7,7,8,8,9,9,10,10,11,11 - eicosafluoro - 1-undecyl)methyl penicillin are prepared using as precursors $H(CF_2CF_2)_2CH_2OCH_2COOH$, $H(CF_2CF_2)_3CH_2OCH_2COOH$
$H(CF_2CF_2)_4CH_2OCH_2COOH$, and $H(CF_2CF_2)_5CH_2OCH_2COOH$ respectively; these precursors are prepared from 1H,1H,5H-octafluoro-1-pentanol, 1H,1H,7H-dodecafluoro-1-heptanol, 1H,1H,9H-hexadecafluoro-1-nonanol, and 1H,1H,11H-eicosafluoro-1-undecanol, respectively, by the procedure set forth in Example II.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. The method of producing a new penicillin which comprises aerobically growing a penicillin-producing mold of the genus Penicillium and group *notatum-chrysogenum* in a nutrient medium containing a precursor selected from the group of precursors having the formula:

$CF_3CH_2OZ$ and $H(CF_2CF_2)_nCH_2OZ$ wherein $n$ represents an integer ranging from 1 through 5, and wherein Z represents a radical selected from the group consisting of —$CH_2COOH$, —$CH_2COOM$ where M is a nontoxic ion which does not inhibit fermentation,

—$CH_2CH_2NH_2$, —$CH_2CONHCH_2CH_2OH$
—$CH_2CONH_2$, —$CH_2CHO$, —$CH_2CH_2OH$ and radicals which are transformed into the equivalent of the —$CH_2COOH$ radical during the course of the fermentation, and isolating the new penicillin so produced.

2. The method of producing a new penicillin which comprises aerobically growing a penicillin-producing mold of the genus Penicillium and group *notatum-chrysogenum* in a nutrient medium containing 2-(2,2,2-trifluoroethoxy)acetic acid and isolating the (2,2,2-trifluoroethoxy)methyl penicillin so produced.

3. The method of producing a new penicillin which comprises aerobically growing a penicillin-producing mold of the genus Penicillium and group *notatum-chrysogenum* in a nutrient medium containing 2-(2,2,3,3-tetrafluoropropoxy)acetic acid, and isolating the (2,2,3,3-tetrafluoropropoxy)methyl penicillin so produced.

References Cited in the file of this patent
UNITED STATES PATENTS

| | | |
|---|---|---|
| 2,476,107 | Moyer | July 12, 1949 |
| 2,477,763 | Moyer | Aug. 2, 1949 |
| 2,562,410 | Behrens | July 31, 1951 |
| 2,713,593 | Brice | July 19, 1953 |
| 2,854,450 | Cheney | Sept. 30, 1958 |

OTHER REFERENCES

Arnstein et al.: Biochem. J., vol. 67, pages 180–187 (1957).